United States Patent [19]
Taylor

[11] Patent Number: 6,119,789
[45] Date of Patent: Sep. 19, 2000

[54] IMPLEMENT TRACKING HITCH

[75] Inventor: Harold E. Taylor, LaGrange, Ga.

[73] Assignee: Durand-Wayland, Inc., LaGrange, Ga.

[21] Appl. No.: 09/141,242

[22] Filed: Aug. 27, 1998

Related U.S. Application Data

[60] Provisional application No. 60/057,105, Aug. 27, 1997.

[51] Int. Cl.[7] .................................................. A01B 59/06
[52] U.S. Cl. ................... 172/439; 172/677; 180/14.2; 180/14.4; 280/461.1
[58] Field of Search ........................... 280/511, 461.1; 464/106, 179; 172/439, 677; 180/235, 14.2, 14.3, 14.4, 14.9; 56/DIG. 9

[56] References Cited

U.S. PATENT DOCUMENTS

| | | | |
|---|---|---|---|
| 1,285,841 | 11/1918 | Tinker | 180/235 |
| 4,776,606 | 10/1988 | Stephenson et al. | 172/439 |
| 4,838,015 | 6/1989 | Mouret et al. | 56/14.9 |
| 5,158,500 | 10/1992 | McLean | 180/53.1 |
| 5,706,901 | 1/1998 | Walters et al. | 172/439 |

FOREIGN PATENT DOCUMENTS

| | | |
|---|---|---|
| 112093 | 12/1940 | Australia . |
| 2652705 | 9/1941 | France . |
| 539690 | 9/1941 | United Kingdom . |

*Primary Examiner*—Thomas B. Will
*Assistant Examiner*—Nathan Mammen
*Attorney, Agent, or Firm*—Jones & Askew

[57] ABSTRACT

Hitch for interconnecting a tractor to a towed implement such as a sprayer, operated by a power takeoff (PTO) of the tractor. The hitch has a turning axis located close to the front of the implement, and a universal joint in the PTO shall be in vertical alignment with the turning axis. The towed implement thus more nearly tracks the tractor in turn, and the universal joint undergoes less vibration and thrust loading during turns.

1 Claim, 5 Drawing Sheets

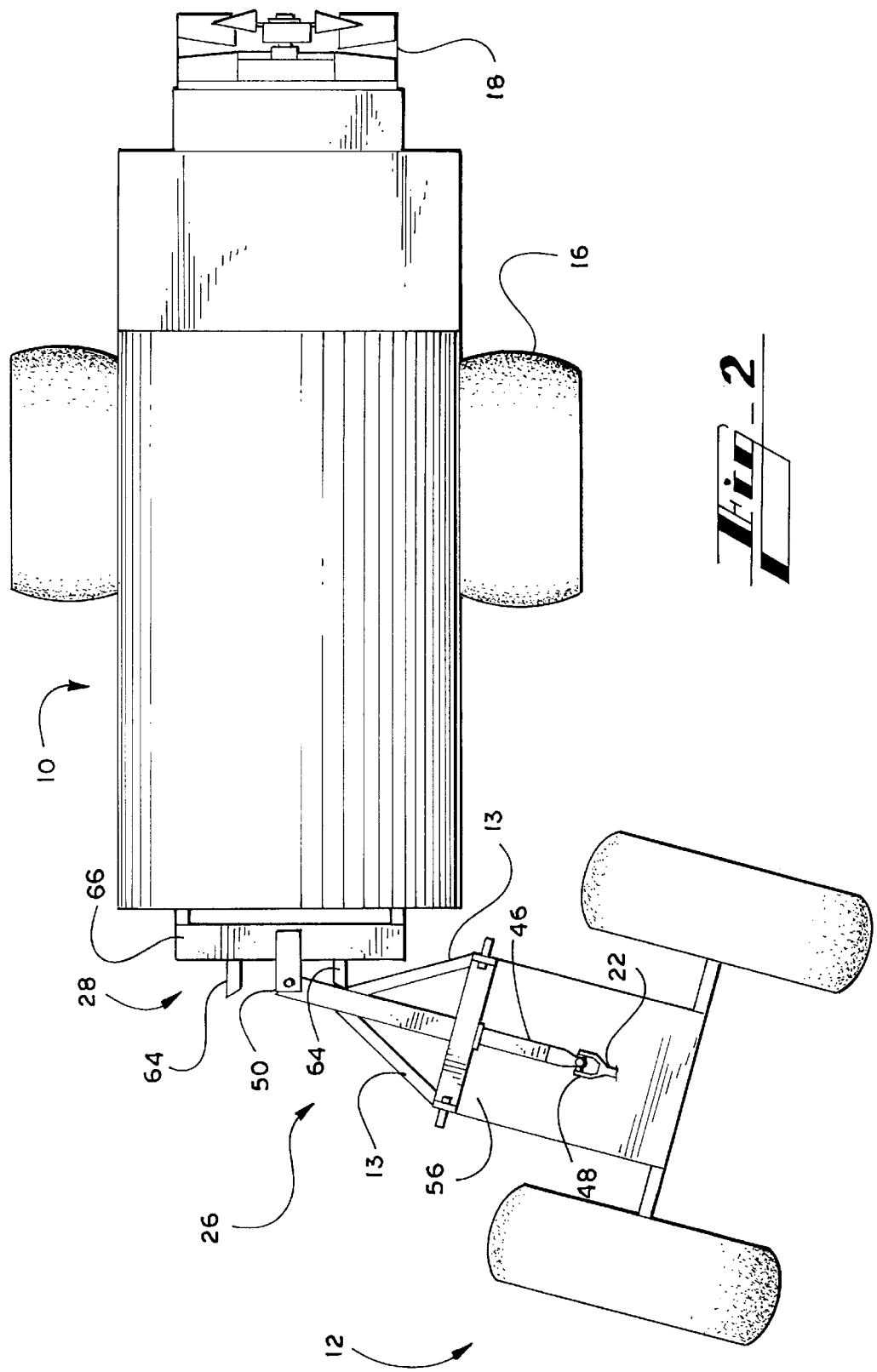

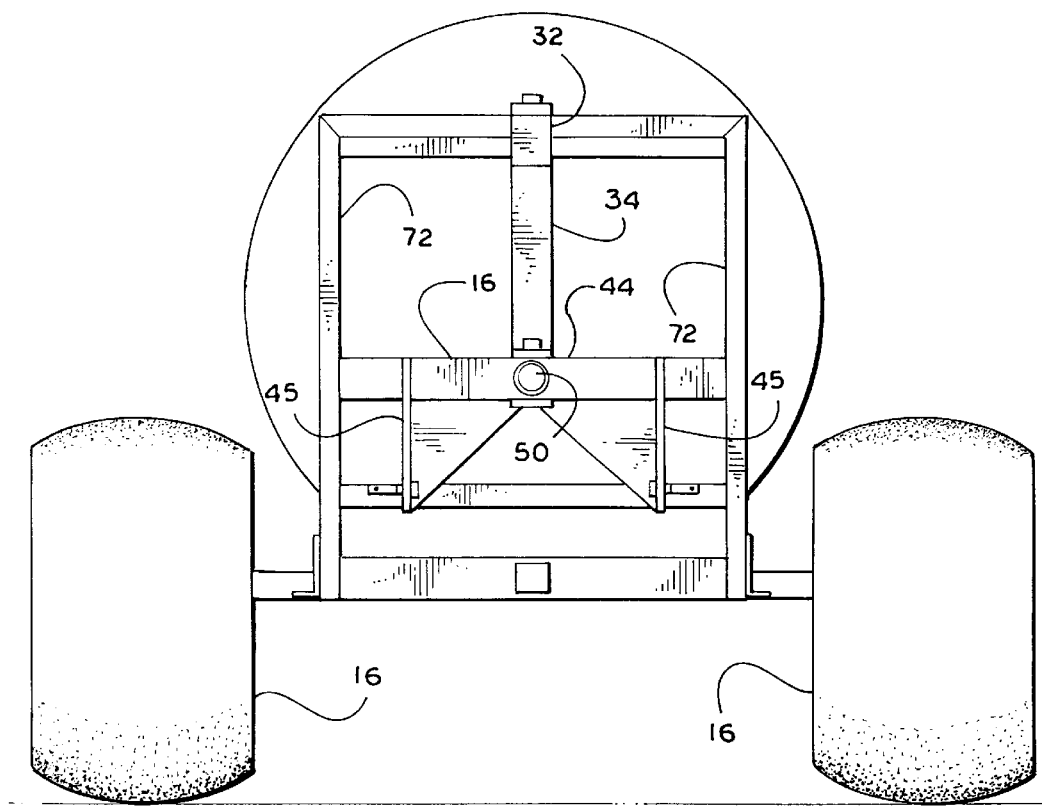
Fig_3
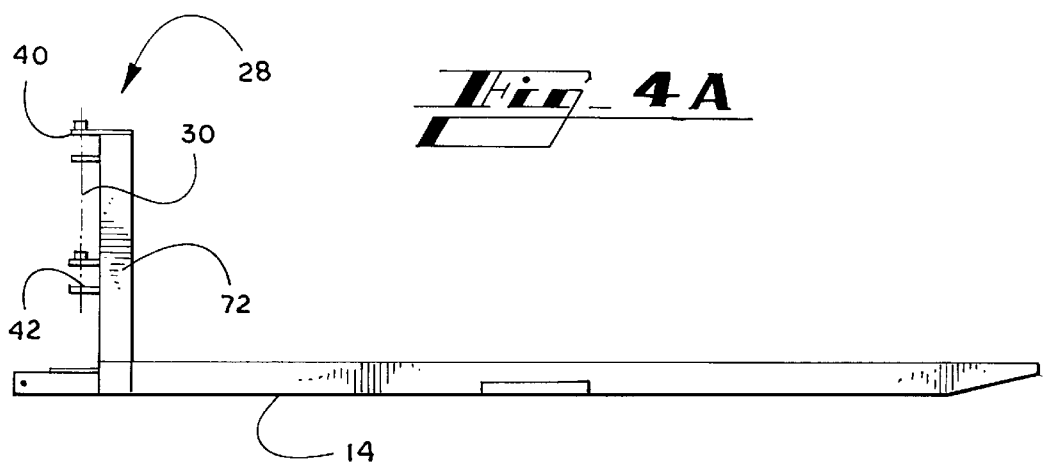
Fig_4A

IMPLEMENT TRACKING HITCH

CROSS-REFERENCE TO RELATED APPLICATION

This application claims the benefit of provisional application No. 60/057,105 filed Aug. 27, 1997.

FIELD OF THE INVENTION

This invention relates in general to farm implements, and relates in particular to an improved hitch and power takeoff drive arrangement for agricultural sprayers and other towed farm implements.

BACKGROUND OF THE INVENTION

Various kinds of farm implements are towed behind a tractor and include equipment operated by a driveshaft connected to the power takeoff (PTO) of the tractor. Agricultural sprayers are one example of such farm implements. Agricultural sprayers typically include a pump driven by the PTO, and power from that shaft may also operate agitator paddles contained in the tank of the sprayer and fans that blow the spray toward trees or other intended targets.

The conventional tractor-drawn sprayer or other PTO-powered equipment is hitched to the drawbar of the tractor with a clevis or similar attachment allowing pivotable movement between the tractor and the towed equipment. To accommodate pivoting movement between the tractor and the towed equipment in the drive train extending rearwardly from the PTO, a constant velocity (CV) joint conventionally is attached to the PTO shaft at the back of the tractor, and a drive shaft extends rearwardly from the CV joint to connect with a driven shaft at the front end of the equipment. The CV joint maintains a constant instantaneous rotational velocity of the drive shaft, throughout each complete revolution of the PTO shaft, whether or not the tractor is turning relative to the towed equipment. The CV joint ideally should be located in vertical alignment with the pivot point at which the towed equipment attaches to the drawbar of the tractor, so that turning movement of the CV joint occurs along a vertical axis coinciding with the turning axis of the hitch. However, in practical applications, such vertical alignment of the CV joint with the hitch is not always present. If the CV joint becomes misaligned with the pivot point of the hitch, oscillating linear forces are produced that apply undesirable thrust loads to the rotating CV joint as the tractor turns.

Furthermore, because the conventional drawbar-mounted pivot point is located close to the rear axle of the tractor, the towed equipment does not closely track the path of the tractor during turns. This lack of tracking increases the likelihood that the tractor driver towing a grove sprayer, for example, may turn too sharply at the end of a row, side-swiping a tree with the sprayer and damaging the tree or the sprayer.

SUMMARY OF THE INVENTION

Stated in general terms, the present invention alleviates the foregoing problems by relocating the hitch point turning axis rearwardly as close as is practicable to the front end of the towed equipment. The CV joint likewise is relocated rearwardly for vertical alignment with the relocated turning axis of the hitch, so that the relocated CV joint is at the back end of the power train coupling the PTO of the tractor with the power shaft of the towed equipment. Relocating the hitch turning axis and the CV joint rearwardly places the pivot point between the tractor and the towed equipment rearwardly to a location more nearly midway between the rear axle of the tractor and the axle of the towed equipment, so that the towed equipment more nearly tracks the path of the tractor during turns. The towed equipment thus more nearly tracks the path of the tractor in turns and is less likely to strike an object during sharp turns.

By relocating the CV joint and the turning pivot rearwardly to the front end of the towed equipment, the manufacturer of that equipment can maintain better control over the locations of those elements in proper alignment, thereby providing a drive train with minimal telescoping in turn and thus greatly reducing the thrust loads on the CV joint and extending its service life.

Accordingly, it is an object of the present invention to provide an improved hitch for towing an implement.

It is another object of the invention to provide an implement hitch that accommodates angular displacement while minimizing vibration and thrust loading on a drive shaft between an implement and a towing vehicle.

Other objects and advantages of the present invention will be apparent from the following description of a preferred embodiment thereof.

BRIEF DESCRIPTION OF THE DRAWINGS

FIG. 2 is a plan view of the apparatus in FIG. 1, showing the tractor making a sharp turn relative to the crop sprayer.

FIG. 3 is a front elevation view of the crop sprayer shown in FIG. 1, without the tractor.

FIG. 4A shows a side view of the frame assembly for the crop sprayer of FIG. 1.

DETAILED DESCRIPTION OF PREFERRED EMBODIMENT

Figure 1:
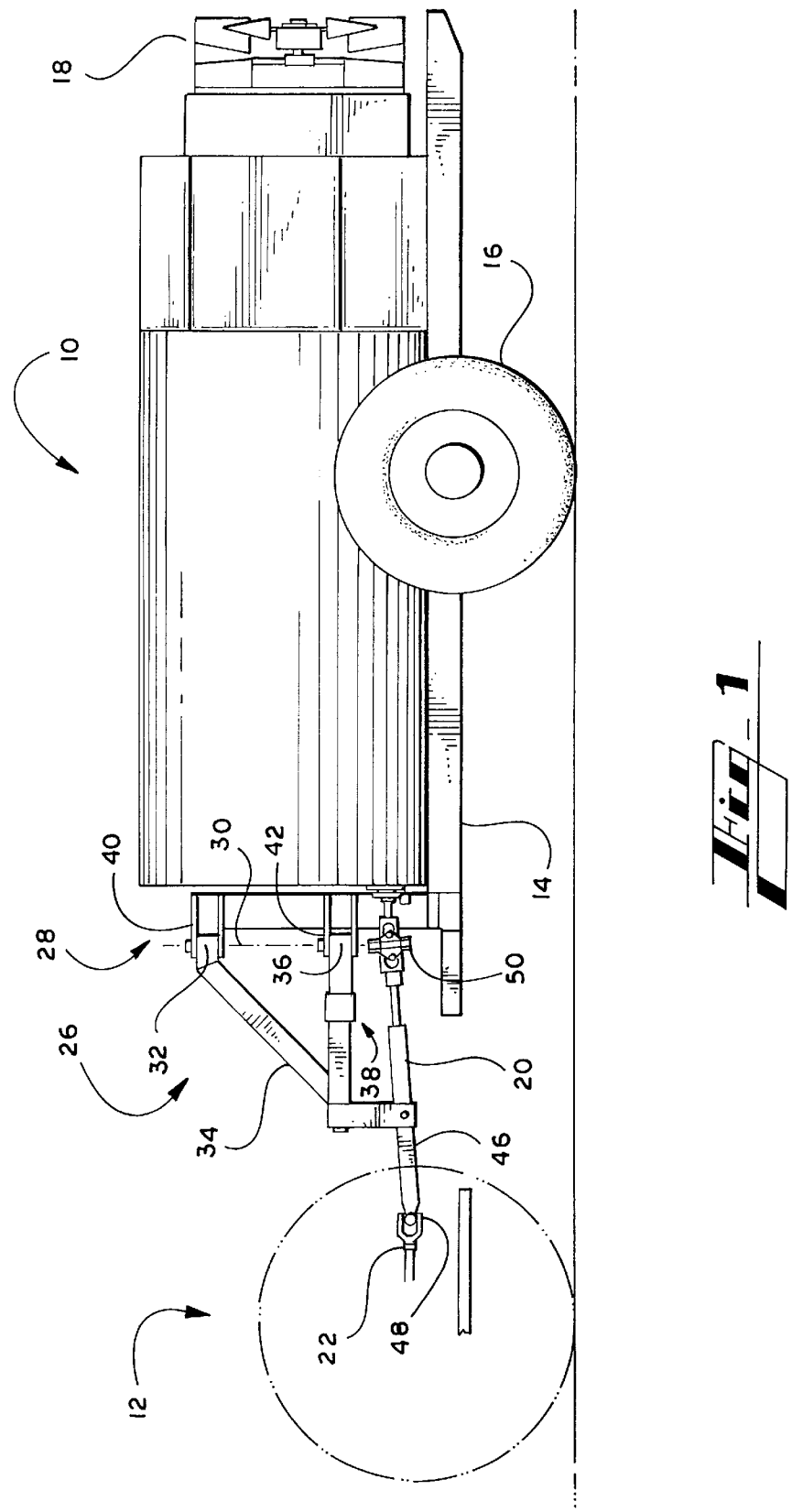
FIG. 1 is a side view showing a crop sprayer equipped with a hitch according to a preferred embodiment of the present invention and coupled to a tractor.

FIG. 1 shows a crop sprayer 10 connected to a tractor 12 shown by its rear wheels. The crop sprayer 10 includes a frame 14 supporting a pair of wheels 16 and having spray dispensing equipment 18 mounted at the back end. The sprayer 10 includes a pump (not shown) and other equipment driven by the conventional shaft 20, which in turn is connected to the PTO 22 of the tractor.

Figure 4B:
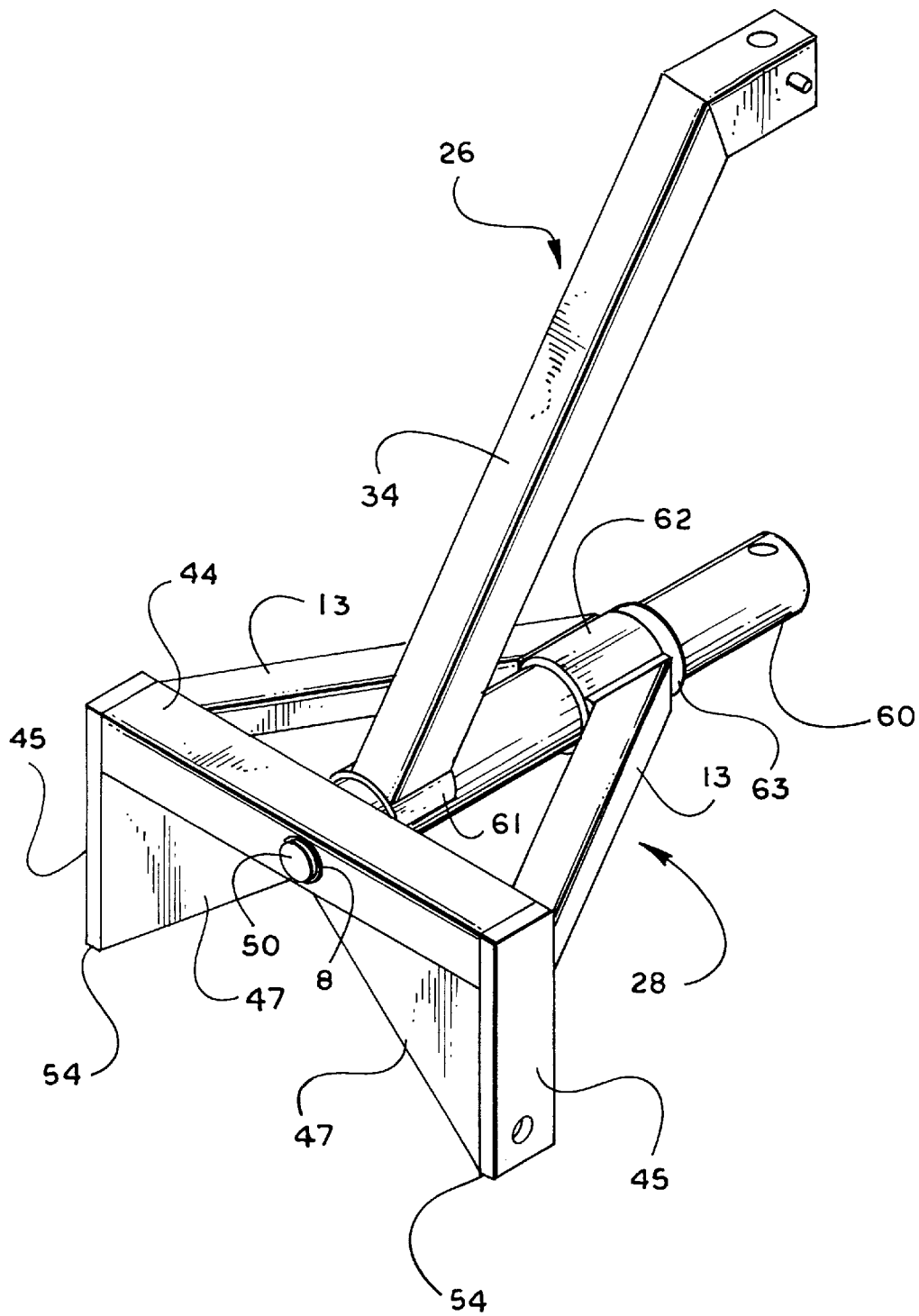
FIG. 4B shows a perspective view of the swivel hitch assembly for the crop sprayer of FIG. 1.

The connection between the sprayer 10 and the tractor 12 includes a swivel hitch 26 attached to the conventional three-point hitch at the back of the tractor, and a frame assembly 28 mounted to the front end of the sprayer frame 14 and extending upright from that frame. Details of the frame assembly 28 are shown in FIG. 4A, and details of the swivel hitch 26 are shown in FIG. 4B. The swivel hitch 26 connects to the frame assembly 28 along a vertical axis 30 (FIG. 1) located in close proximity to the front end of the sprayer 10.

The swivel axis 30 is defined by an upper tubular member 32 supported at the back end of a diagonal frame member 34 of the swivel hitch, and by a lower tubular member 36 mounted at the back end of the swivel tube 38 extending forwardly from the frame assembly 28. The upper tubular member 32 and the lower tubular member 36 are coaxial with each other and are pivotably mounted between respective pairs of pivot plates 40, 42 mounted at the upper end of the frame assembly 28, and spaced down from that upper end. Separate pivot pins extend through the swivel plates 40, 42 and the respective tubular members, retaining the tubular members between the swivel plates and allowing swiveling movement of the swivel hitch 26 with respect to the frame apparatus 28 and the remainder of the sprayer 10. Separate bearings are fitted in the upper and lower tubular members to receive the pivot pins, and each bearing has a lubrication fitting.

The PTO drive assembly includes a telescoping drive shaft 46 which may be of conventional configuration. The front end of the drive shaft is connected to the PTO 22 of the tractor by a universal joint 48, which may be a conventional yoke-type universal joint. The back end of the drive shaft attaches to one side of a CV joint 50, with the other side of the CV joint connected to the input shaft 52 leading to the pump or other powered equipment associated with the sprayer 10. The CV joint 50 is located in close proximity to the front end of the sprayer 10, directly below the lower tubular member 36 of the swivel joint between the tractor and the sprayer. The CV joint 50 thus is in vertical alignment with the swivel axis 30 between the tractor 12 and the sprayer 10 towed by the tractor.

FIG. 4B shows details of the swivel hitch 26. A hitch cross tube 44 is mounted at the front end of the swivel hitch, immediately in front of the diagonal frame member 34 extending upwardly and rearwardly to the upper tubular member 32 forming part of the swivel connection to the frame assembly 28. Lifting bars 45 are fastened to the opposite ends of the cross tube and extend downwardly to lower ends 54 having openings to receive pins that detachably connect to the three-point hitch 56 (FIG. 2) at the back of the tractor 12. Gusset plates 47 are welded between the lifting bars encircled 5 and the cross tube 44 for structural strength. The swivel hitch 26 thus can pivot on a horizontal axis extending through the attaching pins of the three-point hitch, allowing the tractor and the sprayer to pitch up or down as the tractor tows the sprayer over uneven ground.

Figure 4C:
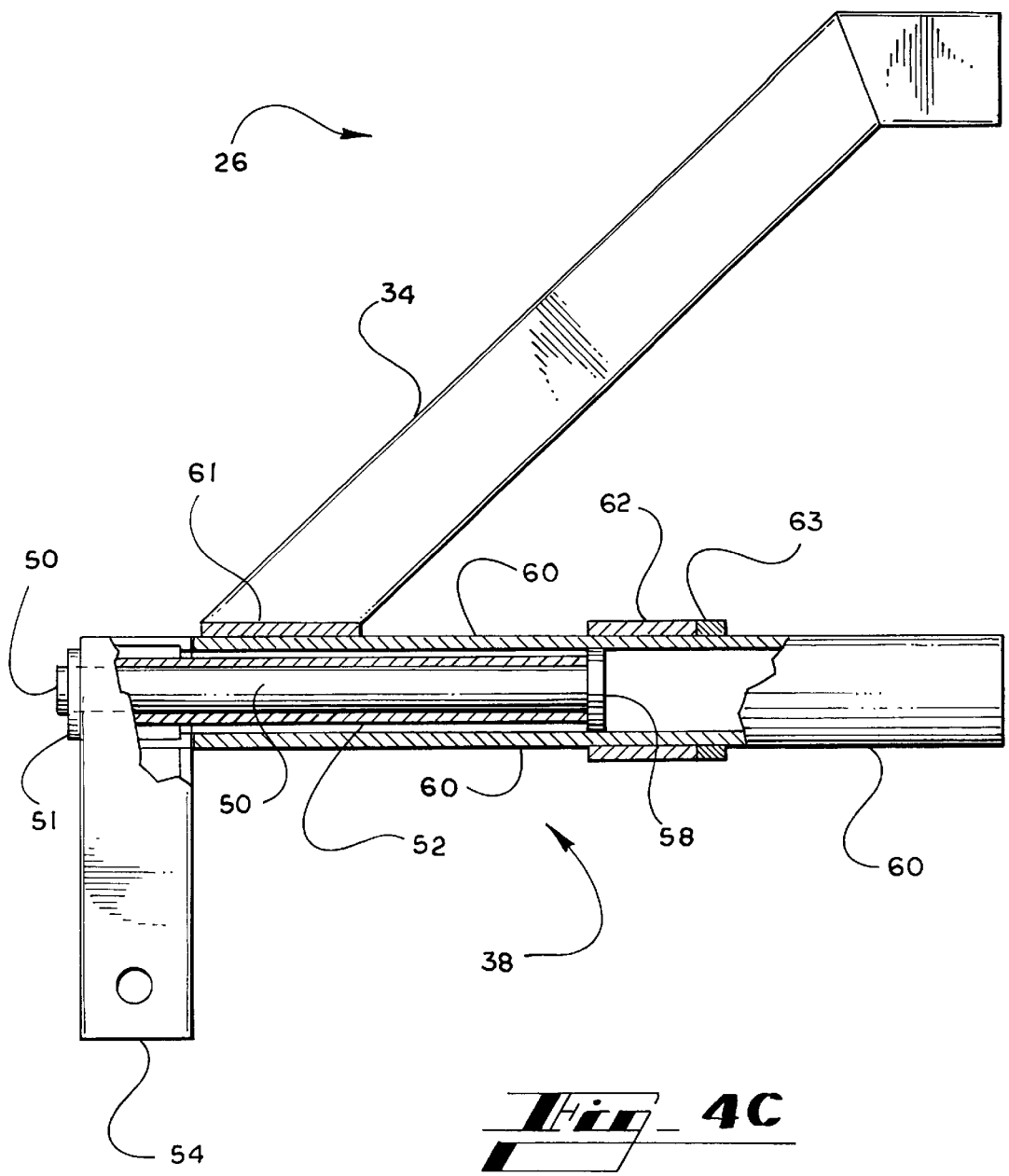
FIG. 4C shows a detailed view of a portion of the swivel hitch assembly for the crop sprayer of FIG. 1.

Rolling movement between the tractor and the sprayer is accommodated by the hitch assembly 38 extending forwardly from the frame assembly 28 mounted at the front end of the sprayer. Details of the hitch tube 38 assembly are shown in FIGS. 4B and 4C. A shaft 50 extends through a transverse opening at the midpoint of the cross tube 44 located at the front end of the swivel hitch 26, and the extending front end of that shaft is welded to a collar 51 so as to retain the shaft for pivoting movement relative to the cross tube. The shaft 50 extends rearwardly from the cross tube, and a swivel tube 52 axially receives the rearwardly-extending portion of the shaft. A second collar 58 is attached to the back end of the shaft 50 to retain the shaft within the swivel tube. The swivel tube 52 fits into the hitch tube 60 extending forwardly from the lower tubular member 36 aligned along the vertical axis 30. The back end of the swivel tube 52 is retained within the hitch tube 60, but the shaft 50 remains free to pivot within the swivel tube. A forward portion of the hitch tube 60 contains slots along part of its length. Once the swivel tube and the hitch tube are telescopically assembled, that assembled position is secured by welding the tubes together through the slots in the hitch tube. The shaft 50 remains pivotable within the swivel tube 52, and the cross tube 44 mounted on the shaft thus can roll axially with respect to the frame assembly 28 and the sprayer attached thereto.

The forward and lower end of the diagonal frame member 34 ends in a mounting channel 61 attached to the forward end of the hitch tube 60. A pair of tubes 13 extend rearwardly from the outer ends of the cross tube 16 and are secured to the collar tube 10 pivotably mounted on the hitch tube 60 to brace the cross tube 44. A smaller collar 63 is mounted on the hitch tube immediately behind the collar tube 62, to axially locate the collar tube on the hitch tube.

Relative rolling movement between the tractor and the sprayer pivots the cross tube 44 attached to the three-point hitch by the lifting bars 54. This pivoting movement also pivots the swivel shaft 50 extending through the cross tube and pivotably received within the swivel tube 52. Rolling movement thus is accommodated between the tractor and the sprayer, as the cross tube 44 pivots relative to the hitch tube 60 and remaining components of the swivel hitch 26.

The maximum turning angle between the tractor 12 and the sprayer 10 is defined by the two elements 64, FIG. 2, formed of tube sections extending forwardly from respective sides of the channel member at the upper end of the frame assembly 28. In a sharp turn as shown in FIG. 2, one of the elements 64 contacts a corresponding side of the swivel hitch 26. The tractor operator, by observing how close the confronting element 64 and s swivel hitch 26 approach each other during a sharp turn, should know when the maximum turning angle of the tractor and sprayer is approached.

Although the preferred embodiment of this invention is disclosed in the context of a crop sprayer, those skilled in the art will realize that the present invention also applies to other kinds of farm machinery that are towed behind a tractor and connected to the PTO of the tractor.

What is claimed is:

1. A drive and hitch apparatus for an implement towed by a tractor and having a power shaft operated by a power takeoff associated with the tractor, the drive and hitch apparatus comprising:

a hitch connecting the implement to the tractor so as to enable turning movement between the vehicles along a substantially vertical axis relative to a predetermined path of travel;

a drive shaft operative for rotation by the power takeoff and coupled to rotate the power shaft associated with the implement;

a constant velocity joint interconnecting the drive shaft with the power shaft at a point substantially in vertical alignment with the vertical axis of turning movement between the tractor and implement so that the turning movement between the vehicles occurs on an axis substantially coincident with the universal joint, thereby reducing vibration as the drive shaft rotates the power shaft when the drive shaft is angularly non-aligned with the power shaft as the tractor turns relative to the towed implement;

the hitch comprising upper and lower pivot assemblies each coaxial with the vertical axis and located above the constant velocity joint proximate to the front end of the towed implement whereby the pivot assemblies turn on mutually-coaxial vertical axes coincident with the constant velocity joint so that the turning axis of the towed implement relative to the tractor is the vertical axis proximate to the front end of the towed implement;

a hitch member extending forwardly from the lower pivot assembly toward the tractor, the hitch member having a first element associated with the lower pivot assembly for turning movement on the vertical axis and having a second element coaxial with the first element on a substantially horizontal axis and pivotable on the horizontal axis;

a frame member having a first end associated with the upper pivot assembly for turning movement on the vertical axis, the frame member extending from the first end to a remote end engaging the first element of the hitch member at a location thereon remote from the lower pivot assembly; and means associated with the second element of the hitch member for connection to the tractor, so that the second element pivots to the first element as the tractor undergoes rolling movement relative to the towed implement.

* * * * *